Figure 1:
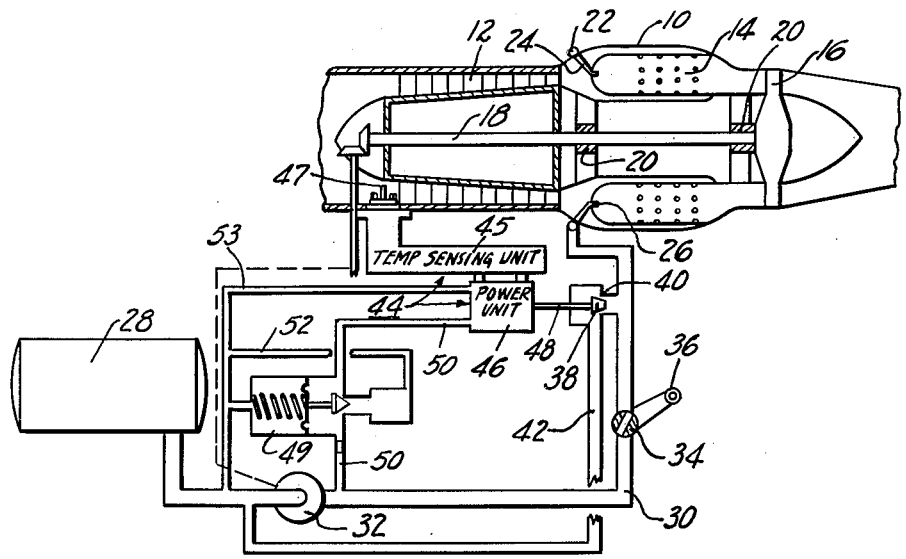

INVENTOR.
WAYNE E. WERTS
BY Cecil D Arens
ATTORNEY

United States Patent Office 2,980,065
Patented Apr. 18, 1961

2,980,065
SERVO MOTOR AND CONTROL APPARATUS THEREFOR

Wayne E. Werts, Oak Ridge, Tenn., assignor to The Bendix Corporation, a corporation of Delaware Filed May 1, 1957, Ser. No. 656,340

6 Claims. (Cl. 121—41)

This invention relates to a control device and while not limited thereto, it is particularly adapted for use in the fuel system of a gas turbine engine.

In the past, difficulties have been experienced with control apparatus of this type wherein a temperature responsive element responds to the temperature of a parameter and acts to produce a relatively small force signal, which signal is transmitted to a servo system which in turn amplifies the signal to produce a relatively large force signal to actuate some component mechanism in a main system.

One difficulty concerns the temperature responsive element. Temperature probes of the expansion type have not been entirely adequate in that the response characteristics of the probes are somewhat slow. Thus, during rapid changes of the measured temperature, the temperature responsive element is unable to respond quickly enough to give reliable control in accordance with the actual temperature existing at the point of measurement.

Another difficulty concerns the linkage mechanism required to transmit the temperature probe signal to the servo-system. Since the temperature responsive element may expand only a minute amount in response to small changes of the measured temperature, it is desirable that the linkage mechanism be capable of transmitting extremely small force signals with a minimum of loss through the linkage due to friction, spring rates, etc.

Another difficulty concerns replacement of the temperature sensing unit and/or the power unit. Since the temperature responsive element is subject to deterioration resulting from the effect of heat to which it is exposed, it is desirable to be able to replace it easily and quickly when the need arises. Furthermore, under circumstances where location and/or mounting of the system presents a problem it may be desirable to place the temperature sensing unit at one location and the power unit at another location.

It is therefore an object of the present invention to improve the reliability of the temperature response characteristics of a control system.

It is another object of the present invention to provide control apparatus which as component of a main system may be easily and quickly disconnected from the main system.

It is a further object of the present invention to provide simple and reliable means for controlling a fluid pressure as a function of a control signal.

It is a still further object of this invention to provide temperature responsive mechanism which is reliable in operation over a wide range of temperatures.

It is still another object of this invention to provide a temperature responsive control mechanism which is positive in action and relatively insensitive to unrelated external influences.

It is a still further object of this invention to provide simple and reliable linkage mechanism for transmitting extremely small force signals with maximum accuracy and efficiency.

Figure 2:
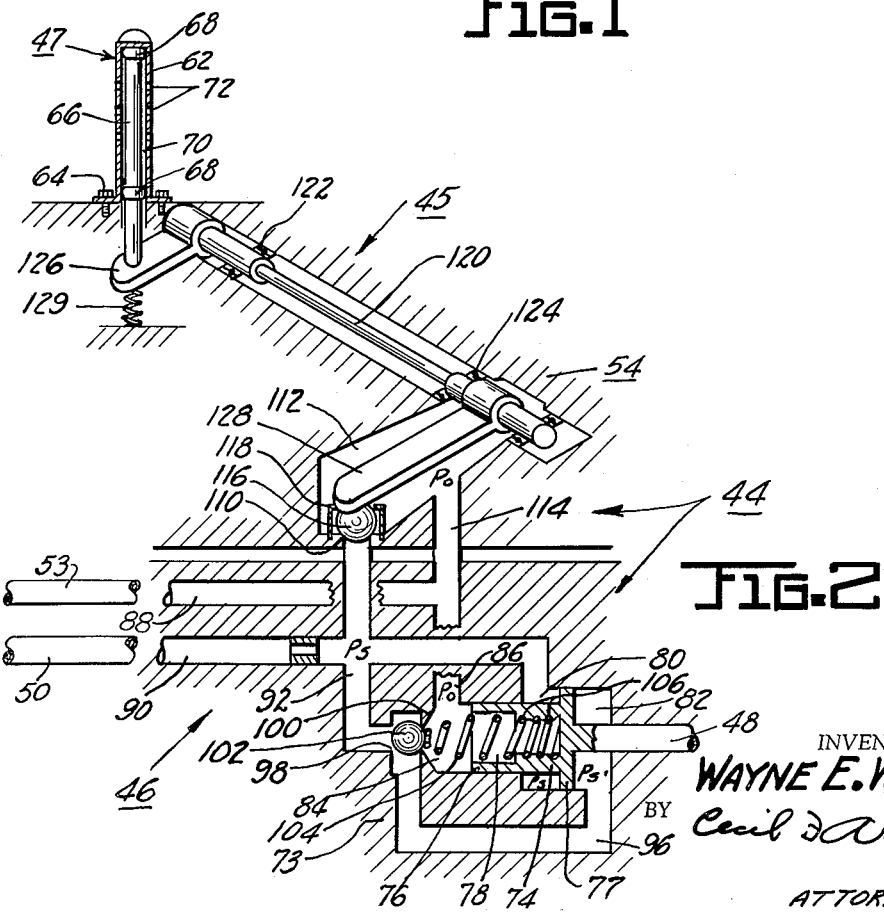

Other objects and advantages of the invention will become apparent from the following detailed description taken in conjunction with the drawings wherein:

Figure 1 is a schematic representation of a fuel system associated with a gas turbine engine and incorporating the present invention; and Figure 2 is a sectional view taken through the temperature sensing unit 45 and the power unit 46 with portions thereof shown isometrically.

Referring now to Figure 1, numeral 10 represents a gas turbine engine having a compressor 12, combustion chambers 14 and a turbine 16 drivably connected to the compressor through a shaft 18. The shaft 18 is journalled in bearings 20. Fuel is supplied to the combustion chambers 14 from a fuel manifold 22 via individual fuel lines 24 and fuel nozzles 26 where the fuel is mixed with air from the compressor 12 and burned. These hot gases which are by-products of combustion expand through the turbine to thereby impart rotation thereto.

Fuel is delivered to the fuel manifold from a fuel tank 28 via a fuel conduit 30 and an engine driven fuel pump 32. A main fuel valve 34 operably connected to an operator actuated control lever 36 is arranged to control the flow of fuel through conduit 30. A valve 38 is arranged to control the flow area of a valve port 40 which connects conduit 30 upstream from the main fuel valve 34 with a fuel return line 42 leading to the inlet side of the pump 32.

The valve 38 is actuated by a control unit 44 which includes a temperature sensing unit 45 and a power unit 46. The temperature sensing unit 45 is provided with a temperature responsive element 47 which extends into the air intake portion of the engine. The element 47 is exposed to the air flowing to the compressor inlet. The valve 38 is actuated by the power unit 46 through a rod 48. A fuel pressure regulating unit 49 is connected across the inlet and discharge ports of pump 32 so as to control the flow in conduit 50 communicating the discharge side of the pump with the power unit 46. The regulating unit 49 operates in a conventional manner to maintain a supply of fuel at a predetermined constant pressure $P_{RS}$ to the power unit 46 for the operation of servo mechanism associated therewith. A fuel drain line 53 communicates power unit 46 with the passage 52.

Referring now to Figure 2, the control unit 44 which forms the present invention is shown in sectional view.

The temperature sensing unit 45 of the control unit 44 includes a casing 54 which is secured to the engine by any suitable means. The temperature responsive element 47 includes a thin walled cylindrical shell 62, the bottom end of which is flanged and fixedly secured to casing 54 through any suitable means such as fastening members 64. A circular core 66 extends through the open bottom end of the shell 62 and is fixedly secured to the closed top end of the shell through any suitable means such as welding. The core 66 is provided with an enlarged diameter section 68 slidably engaged with the inner surface of shell 62. The shell 62 and core 66 respectively are formed of materials having high and low coefficients of expansion. In response to variations in compressor inlet air temperature this combination results in substantial movement of the core 66 as a function of the amount of expansion or contraction of the shell 62 only. To improve the response characteristics of the shell 62, the compressor inlet air communicates with an annular space 70 between the core 66 and shell 62 through a plurality of holes 72 formed in the wall of shell 62.

The power unit 46 of the control unit 44 is provided with a casing 73 in which a piston 74 having an annular skirt 76 and enlarged head 77 is slidably contained in a stepped bore 78. The enlarged head 77 divides the bore 78 into three variable volume chambers 80, 82 and 84. Variable volume chamber 84 communicates with the return fuel line 53 via passages 86 and 88. A restricted inlet passage 90 communicates regulated fuel pressure $P_{RS}$ from passage 50 to a passage 92 which is connected with variable volume chamber 80 through a passage 94. The variable volume chamber 82 communicates via passage 96 with passage 92 through a valve port 98 or with bore 84 through a valve port 100 depending upon the position of spherical valve member 102 relative to the valve ports. The spherical valve member 102 is actuated in response to pressure $P_S$ in passage 92 in opposition to the drain pressure $P_O$ in chamber 84 and the force of a spring 104 interposed between piston 74 and said valve 102. One end of spring 104 extends into the central portion of annular skirt 76 and is removably secured in recesses 106 formed in the skirt. The rod 48 is fixedly secured to piston 74 and extends therefrom thru casing 73 into engagement with valve 38. Passage 92 is provided with a branch line terminating at valve port 110 which in turn communicates with passage 88 via chamber 112 and passage 114. A flapper valve 116 operably secured adjacent valve port 110 by a retaining member 118 is arranged to control the effective flow area of the port 110 and thus the servo pressure $P_S$ in passage 92.

The position of flapper valve 116 relative to valve port 110 is controlled by a torsion bar 120 of any suitable design which will afford a torsional resistance to an applied force. The torsion bar 120 has enlarged diameter end sections which are rotatably mounted in anti-friction bearings 122 and 124. Levers 126 and 128 fixedly secured to the torsion bar 120 at opposite ends thereof extend into engagement with core 66 and flapper valve 116 respectively. A spring 129 operates to urge lever 126 into engagement with core 66. Movement of the core 66 in response to variations in compressor inlet air temperature is transmitted through the torsion bar 120 to the flapper valve 116 to cause a corresponding variation in the pressure $P_S$ and movement of piston 74. At any given temperature of the compressor inlet air the torsion bar 120 is stabilized in position in response to equal and opposite forces applied thereto by the core 66 through lever 126 and by the pressure $P_S$ acting against the effective area of flapper valve 116 which in turn acts against lever 128. Thus, the load transmitted by the torsion bar at any given stabilized position is a function of the temperature existing at the compressor inlet.

Operation of the device of the invention is as follows:

Assume the control lever 36 to be in a selected position where the main fuel valve 34 permits a predetermined amount of fuel to flow through conduit 30 to the engine. At this time engine operation will be stable at a given engine speed. Since the engine speed will vary as a function of the temperature of the air at the compressor inlet the amount of fuel supplied to the engine at this time must be sufficient to maintain the engine on speed only at that particular compressor inlet temperature at which it is operating. Now let us assume a decrease in compressor inlet air temperature under which condition the speed of the engine will tend to decrease. The shell 62 will contract and actuate core 66 downward to cause a rotation of lever 126 in a counterclockwise direction looking from the righthand end of torsion bar 120. The flapper valve 116 will be moved towards valve port 110 causing an increase in pressure $P_S$ to variable volume chamber 80 and an actuation of piston 74 towards the right. The spherical valve 102 is subsequently unbalanced in response to the decrease in spring 104 force and the increase in pressure $P_S$ and moves toward valve port 100 to effect a decrease in flow through valve port 100 and an increase in pressure $P_S'$ in variable volume chamber 82. The pressure $P_S'$ is increased to the value required to balance the piston 74 against the opposing $P_S$ pressure. Whereupon the spherical valve 102 is stabilized in response to the $P_S$—$P_O$ pressure differential and spring 104 force acting thereagainst. The movement of piston 74 is transmitted to valve 38 through rod 48 such that the effective flow area of valve port 40 is decreased accordingly to permit less fuel to flow therethrough to return line 42.

The subsequent increase in fuel flow through conduit 30 to the fuel manifold 22 causes an increase in engine speed to compensate for the variation in compressor inlet air temperature such that the selected engine speed will be maintained.

If the compressor inlet air temperature should increase the engine speed will increase accordingly and the above mentioned sequence of operations will be reversed such that the valve 38 will move toward an open position to cause an increase in the flow of fuel through valve port 40 and a subsequent decrease in fuel flow to the engine to maintain engine speed at the selected value.

Although only one embodiment of the invention has been disclosed herein, numerous changes may be made to suit requirements without departing from the scope of the invention. The pressure $P_S'$ which actuates piston 74 may be controlled by a conventional static pressure servo valve rather than the spherical servo valve 102 although the flowing pressure type of action provided by the spherical valve is advantageous in that less complicated structure is required without sacrificing a loss in performance of the system.

I claim:

1. Fluid operated control apparatus operative with a control system having an input member responsive to a variable input signal and a movable member for controlling a condition of operation as a function of the variable input signal, comprising a housing, a chamber in said housing, pressure responsive means slidably disposed in said chamber, and operatively connected to said movable member, a source of fluid pressure, a first fluid connection comunicating said source with one side of said pressure responsive means, a second fluid connection communicating said source with the opposite side of said pressure responsive means, a branch fluid connection communicating said second fluid connection with a source of drain pressure, two-way yieldable valve means operably connected to said second fluid connection and to said branch fluid connection, said yieldable valve means being actuable in a first direction to increase the effective flow area of said second fluid connection and to decrease the effective flow area of said branch fluid connection and in a second direction to act in the opposite manner, and resilient means operably connected to said yieldable valve means and said pressure responsive means, said resilient means acting to bias said yieldable valve means in said second direction in accordance with the position of said pressure responsive means, and means operatively connected to said source for controlling said fluid pressure as a function of said variable input signal, said pressure responsive means and said yieldable valve means being responsive to an increase in said fluid pressure, said yieldable valve means being unbalanced in said first direction whereupon the fluid pressure to said opposite side of said pressure responsive means is increased in proportion to the increase in said fluid pressure to effect a stabilization of said pressure responsive means.

2. Fluid operated control apparatus operative with an input member and a movable member, said input member being responsive to a variable input signal and said movable member being positioned in accordance with the response of said input member, comprising a housing, a chamber in said housing, pressure responsive means disposed in said chamber operatively connected to said movable member, a source of relatively high fluid pressure, a source of relatively low fluid pressure, a first passage connecting said sources of pressure, a restriction in said first passage, valve means in said first passage for controlling the flow of fluid therethrough such that a control fluid pressure is established downstream from said restriction, said valve means being responsive to said control fluid pressure, a second passage communicating said control fluid pressure with one side of said pressure responsive means, a third passage communicating said control fluid pressure with the opposite side of said pressure responsive means, a first variable area orifice in said third passage for modifying said control fluid pressure, a second variable area orifice in said third passage downstream from said first variable area orifice for venting said third passage to said source of relatively low fluid pressure, two-way yieldable valve means responsive to said control fluid pressure operatively connected to said first and second variable area orifices for simultaneously varying the effective flow areas thereof, a feedback spring interposed between said yieldable valve means and said pressure responsive means for loading said yieldable valve means in opposition to the control fluid pressure acting against said yieldable valve means, and a torsion member operatively connected to said input member and said first named valve means for actuating said first named valve means in accordance with the output load of said input member to cause a corresponding variation in said control fluid pressure, said output load subsequently being balanced by the control fluid pressure acting against said first named valve means, said pressure responsive means and said yieldable valve means being responsive to said variation in said control fluid pressure whereupon said load imposed against said yieldable valve means by said feedback spring is varied to cause an increase or a decrease in the effective flow area of said first variable area orifice whereupon said pressure responsive means is balanced in response to the pressure differential between said control fluid pressure and said modified control fluid pressure.

3. Fluid operated control apparatus operative with an input member and a movable member, said input member being responsive to a variable input signal and said movable member being positioned in accordance with the response of said input member, comprising a housing, a chamber in said housing, a pressure responsive member slidably disposed in said chamber and operatively connected to said movable member, a source of relatively high fluid pressure, a source of relatively low fluid pressure, a passage connecting said sources of pressure, a restriction in said passage, valve means in said passage for controlling fluid flow therethrough such that a control fluid pressure is established downstream from said restriction, a torsion rod operatively connected to said input member and said valve means, said valve means being loaded in a closing direction by said torsion rod and being loaded in the opposite direction by said control fluid pressure which acts to balance the torsion bar load, a passage communicating said control fluid pressure with said chamber on one side of said pressure responsive member, a passage communicating said control fluid pressure with said chamber on the opposite side of said pressure responsive member, a first variable area orifice in series flow with said third named passage, a second variable area orifice through which said third named passage is vented to said source of relatively low fluid pressure, said first and second variable orifices being operative to cause a modification in the control fluid pressure supplied to said chamber through said third named passage, said pressure responsive member being responsive to the pressure differential between said control fluid pressure and said modified control fluid pressure, two-way yieldable valve means responsive to said control fluid pressure operatively connected to said first and second variable area orifices for simultaneously varying the effective flow areas thereof, feedback means interposed between said pressure responsive member and said yieldable valve means for loading said yieldable valve means in opposition to the control fluid pressure acting thereagainst, said pressure responsive member responding to variations in said control fluid pressure whereupon said yieldable valve means is repositioned to cause a corresponding change in said modified control fluid pressure and a subsequent stabilization of said pressure responsive member.

4. Fluid operated control apparatus operative with a control system having an input member responsive to a variable input signal and a movable member for controlling a condition of operation as a function of the variable input signal, comprising a housing, a chamber in said housing, pressure responsive means disposed in said chamber operatively connected to said movable member and responsive to a control fluid pressure differential, means including valve means for generating a first control fluid pressure, a torsion member operatively connected to said input member and said valve means for actuating said valve means to cause a corresponding variation in said first control fluid pressure, a valve member in parallel flow relationship with said valve means for generating a second control fluid pressure derived from said first control fluid pressure, said valve member being responsive to said first control fluid pressure, said pressure responsive means being responsive to the differential between said first and second named control fluid pressures, and feedback means including resilient means operatively connected to said valve member and said pressure responsive means for loading said valve member as a function of the position of said pressure responsive means in opposition to said first control fluid pressure, said pressure responsive means being responsive to a variation in said first control fluid pressure whereupon said valve member is positioned to cause a corresponding variation in said second control fluid pressure and a subsequent stabilization of said pressure responsive means.

5. Fluid operated control apparatus operative with a control system having an input member responsive to a variable input signal and a movable member for controlling a condition of operation as a function of said input signal, comprising means including valve means for generating a control fluid pressure, a pressure responsive member having oppositely disposed faces, said pressure responsive member being operatively connected to said movable member, one of said faces having a relatively small effective area and the other of said faces having a relatively large effective area, a first conduit connecting said control fluid pressure with said face of relatively small effective area, a second conduit connecting said control fluid pressure with said face of relatively large effective area, first and second variable area orifices in said second conduit, said first orifice being in series flow relationship with said second conduit and arranged to modify said control fluid pressure, said second orifice being downstream from said first orifice and arranged to vent said second conduit to a source of drain fluid pressure valvular means reponsive to said control fluid pressure operatively connected to said first and second variable area orifices for simultaneously varying the effective flow area thereof, position feedback means operatively connected to said valvular means and said pressure responsive means for loading said valvular means in opposition to said control fluid pressure, and a rotatably mounted torsion member operatively connected to said valve means and said input member for actuating said valve means in response to variations in said input signal to cause a corresponding variation in said control fluid pressure, said pressure responsive means and said valvular means being responsive to said variation in said control fluid pressure whereupon said valvular means is positioned relative to said first and second variable area orifices to cause a variation in said control fluid pressure and subsequent stabilization of said pressure responsive means, said valvular means subsequently being stabilized by said position feedback means which acts to balance the control fluid pressure acting against said valvular means.

6. Fluid operated control apparatus, operative with a control system having an input member responsive to a variable input signal and a movable member for controlling a condition of operation as a function of the variable input signal, comprising fluid pressure differential responsive means operatively connected to said movable member for actuating the same, means including valve means operatively connected to and actuated by said input member for generating a first control fluid pressure, a valve member responsive to said first control fluid pressure and arranged in parallel flow relationship with said valve means for generating a second control fluid pressure derived from said first control fluid pressure, said pressure differential responsive means being responsive to the differential between said second and first control fluid pressures, resilient means operatively connected to said valve member and said pressure differential responsive means for loading said valve member as a function of the position of said pressure differential responsive means in opposition to said first control fluid pressure, said pressure differential responsive means and said valve member being responsive to a variation in said first control fluid pressure whereupon said valve member is positioned to cause a corresponding variation in said modified control fluid pressure and subsequent stabilization of said pressure differential responsive means, said valve member being stabilized by said resilient means which opposes said first control fluid pressure acting against said valve member.

References Cited in the file of this patent

UNITED STATES PATENTS

| | | |
|---|---|---|
| 2,146,176 | Donaldson | Feb. 7, 1939 |
| 2,541,805 | Berkey et al. | Feb. 13, 1951 |
| 2,616,254 | Mock | Nov. 4, 1952 |
| 2,626,753 | Merrill | Jan. 27, 1953 |
| 2,750,734 | Anxionnaz et al. | June 19, 1956 |
| 2,759,549 | Best | Aug. 21, 1956 |
| 2,784,550 | Marcy et al. | Mar. 12, 1957 |
| 2,835,265 | Brandstadter | May 20, 1958 |